United States Patent
Wu et al.

(10) Patent No.: US 8,526,178 B2
(45) Date of Patent: Sep. 3, 2013

(54) ALL-IN-ONE COMPUTING DEVICE WITH AN ADJUSTABLE SCREEN HEIGHT

(75) Inventors: Chun-Ting Wu, New Taipei (TW); Yu-Tsiang Lin, Taipei (TW)

(73) Assignee: Flextronics AP, LLC, Broomfield, CO (US)

( * ) Notice: Subject to any disclaimer, the term of this patent is extended or adjusted under 35 U.S.C. 154(b) by 138 days.

(21) Appl. No.: 13/109,848

(22) Filed: May 17, 2011

(65) Prior Publication Data
US 2012/0293936 A1 Nov. 22, 2012

(51) Int. Cl.
*G06F 1/16* (2006.01)

(52) U.S. Cl.
USPC ............ 361/679.55; 361/679.02; 361/679.03; 361/679.21; 361/679.27; 361/679.29; 312/223.2; 312/223.3; 248/125.2; 248/176.3; 248/918

(58) Field of Classification Search
USPC ............ 361/679.01, 679.02, 679.05–679.09, 361/679.16, 679.17, 679.2–679.23, 679.26–679.3, 361/679.55–679.59; 248/176.3, 188.8, 125.2, 248/316.1, 919–924; 312/223.2, 223.3; D14/308, 315–328
See application file for complete search history.

(56) References Cited

U.S. PATENT DOCUMENTS

| | | | |
|---|---|---|---|
| 5,247,285 A | 9/1993 | Yokota et al. | |
| 5,375,076 A * | 12/1994 | Goodrich et al. | ........ 361/679.17 |
| 5,768,163 A | 6/1998 | Smith, II | |
| 5,926,364 A | 7/1999 | Karidis | |
| D416,003 S | 11/1999 | Schiefer | |
| 6,341,061 B1 | 1/2002 | Eisbach et al. | |
| 6,351,372 B1 * | 2/2002 | Kim | .......... 361/679.15 |
| 6,353,529 B1 | 3/2002 | Cies | |
| 6,430,038 B1 | 8/2002 | Helot et al. | |
| 6,437,974 B1 | 8/2002 | Liu | |
| 6,464,195 B1 | 10/2002 | Hildebrandt | |
| 6,480,374 B1 | 11/2002 | Lee | |
| 6,483,445 B1 * | 11/2002 | England | ........... 341/22 |
| 6,829,140 B2 | 12/2004 | Shimano et al. | |
| 6,845,005 B2 | 1/2005 | Shimano et al. | |
| 6,903,927 B2 | 6/2005 | Anlaff | |
| 6,972,944 B2 * | 12/2005 | Clapper | ............. 361/679.08 |
| D519,500 S * | 4/2006 | Maskatia et al. | ............. D14/318 |
| 7,035,665 B2 | 4/2006 | Kido | |
| 7,061,472 B1 | 6/2006 | Schweizer et al. | |
| 7,068,497 B2 | 6/2006 | Chu | |
| 7,107,084 B2 | 9/2006 | Duarte | |
| 7,180,731 B2 * | 2/2007 | Titzler et al. | ............. 361/679.22 |

(Continued)

OTHER PUBLICATIONS

Office action dated Apr. 26, 2013, U.S. Appl. No. 13/004,768, filing date Jan. 11, 2011, applicant Chun-Ting Wu, Art Unit: 2835, 21 pages.

*Primary Examiner* — Michail V Datskovskiy
(74) *Attorney, Agent, or Firm* — Haverstock & Owens, LLP (57) ABSTRACT

An apparatus includes a processing portion and a user interface portion. The user interface portion is slidably coupled to the processing portion along a first axis. The apparatus also includes a stand that is hingedly coupled to the user interface portion. The stand rotates about a second axis orthogonal to the first axis. In some embodiments, the stand includes a U-bar. When the stand is coupled to the processing portion in an open position, the U-bar is able to receive cables therethrough. When the stand is coupled to the processing portion in a closed position, the stand is positioned within a recess, adapted to receive the stand, of the processing portion. In some embodiments, the user interface portion is removable from the processing portion.

12 Claims, 7 Drawing Sheets

(56) References Cited

U.S. PATENT DOCUMENTS

| | | | |
|---|---|---|---|
| 7,215,538 B1 | 5/2007 | Chen et al. | |
| 7,239,505 B2 | 7/2007 | Keely et al. | |
| 7,255,317 B2 | 8/2007 | Huang | |
| 7,280,348 B2 * | 10/2007 | Ghosh | 361/679.27 |
| 7,293,747 B2 * | 11/2007 | Wang et al. | 248/125.2 |
| D557,695 S * | 12/2007 | Cheng et al. | D14/315 |
| 7,353,053 B2 * | 4/2008 | Prichard et al. | 455/575.4 |
| D580,429 S * | 11/2008 | Cheng et al. | D14/315 |
| 7,457,108 B2 * | 11/2008 | Ghosh | 361/679.27 |
| 7,492,891 B2 | 2/2009 | Eldon | |
| 7,502,222 B2 * | 3/2009 | Cheng et al. | 361/679.55 |
| D590,388 S * | 4/2009 | Price et al. | D14/345 |
| 7,565,414 B1 * | 7/2009 | Love | 709/219 |
| 7,573,703 B2 | 8/2009 | Chuang | |
| 7,633,745 B2 * | 12/2009 | Sakakibara et al. | 361/679.11 |
| 7,652,873 B2 | 1/2010 | Lee | |
| 7,715,180 B2 * | 5/2010 | Titzler et al. | 361/679.23 |
| 7,733,331 B2 * | 6/2010 | Duarte et al. | 345/169 |
| 7,836,554 B2 * | 11/2010 | Fu | 16/362 |
| 7,884,815 B2 * | 2/2011 | Fraser et al. | 345/204 |
| 7,898,796 B2 * | 3/2011 | Horie | 361/679.02 |
| 7,911,783 B2 | 3/2011 | Hsieh | |
| D669,467 S * | 10/2012 | Ballout | D14/336 |
| 8,280,464 B2 * | 10/2012 | Liu | 455/575.3 |
| 8,289,683 B2 * | 10/2012 | Wang | 361/679.02 |
| 8,306,584 B2 * | 11/2012 | Yeh et al. | 455/575.4 |
| 2003/0030971 A1 * | 2/2003 | Duarte | 361/680 |
| 2004/0057197 A1 | 3/2004 | Hill et al. | |
| 2004/0135738 A1 | 7/2004 | Kim | |
| 2004/0174666 A1 * | 9/2004 | Brandenberg et al. | 361/680 |
| 2004/0228076 A1 * | 11/2004 | Clapper | 361/681 |
| 2004/0233620 A1 | 11/2004 | Doczy | |
| 2005/0052833 A1 | 3/2005 | Tanaka | |
| 2005/0264983 A1 | 12/2005 | Chen | |
| 2006/0126284 A1 | 6/2006 | Moscovitch | |
| 2006/0187626 A1 | 8/2006 | Ditzik | |
| 2006/0264243 A1 | 11/2006 | Aarras | |
| 2007/0182663 A1 | 8/2007 | Biech | |
| 2007/0217131 A1 | 9/2007 | Kehr | |
| 2007/0217135 A1 | 9/2007 | Chuang | |
| 2007/0236873 A1 | 10/2007 | Yukawa | |
| 2007/0263067 A1 * | 11/2007 | Huang et al. | 348/14.01 |
| 2008/0007904 A1 | 1/2008 | Chen et al. | |
| 2008/0024388 A1 | 1/2008 | Bruce | |
| 2008/0180892 A1 * | 7/2008 | Lai | 361/680 |
| 2008/0207272 A1 | 8/2008 | Thornton et al. | |
| 2008/0232054 A1 | 9/2008 | Chen | |
| 2008/0266767 A1 * | 10/2008 | Nicholas et al. | 361/681 |
| 2009/0095854 A1 * | 4/2009 | Forbes et al. | 248/176.3 |
| 2009/0190295 A1 | 7/2009 | Chin | |
| 2009/0244832 A1 | 10/2009 | Behar et al. | |
| 2010/0053876 A1 * | 3/2010 | Widmer et al. | 361/679.27 |
| 2010/0064536 A1 | 3/2010 | Caskey et al. | |
| 2010/0267428 A1 | 10/2010 | Wang et al. | |
| 2011/0061277 A1 | 3/2011 | Demott | |
| 2011/0286170 A1 | 11/2011 | Liu | |
| 2012/0176741 A1 | 7/2012 | Wu | |
| 2012/0182227 A1 | 7/2012 | Wu | |

* cited by examiner

ALL-IN-ONE COMPUTING DEVICE WITH AN ADJUSTABLE SCREEN HEIGHT

FIELD OF THE INVENTION

The present invention relates to all-in-one computing devices. More particularly, the present invention relates to an all-in-one computing device with an adjustable screen height.

BACKGROUND OF THE INVENTION

All-in-one (AIO) computers are more compact than their counterpart traditional desktop computers, which makes AIO computers appealing to consumers. A traditional AIO computer integrates a screen and a computing system as one unit to optimize a user's work space. Peripheral devices, such as a keyboard, a mouse and a speaker, are typically in communication with the unit. Orientation of the unit is limited since the unit is typically mounted to a stationary stand. For example, to adjust the height of the screen, a user must resort to an alternative solution such as positioning the AIO computer on a raised platform. Although the traditional AIO computer saves space, the traditional AIO computer has power and heat limitations because of the integration of two electronic devices (i.e., a screen and a system) into one. In addition, because of the integration of the two electronic devices, the user will need to purchase another AIO computer if the user needs a different screen size. Such inevitable purchases of having a traditional AIO computer do not help the user reduce or save costs.

What is needed is an AIO computer that is compact yet addresses at least these limitations associated with the integration of a computing system and a screen.

SUMMARY OF THE INVENTION

Embodiments of the present invention are directed towards an all-in-one (AIO) computing device with an adjustable screen height. The AIO computing device typically includes a processing portion and a user interface portion. The user interface portion is slidably coupled to the processing portion along a first axis and is able to stop in one of a plurality of positions along the first axis, depending on a desired screen height.

In one aspect, an apparatus includes a processing portion and a user interface portion. The user interface portion is slidably coupled to the processing portion along a first axis. In some embodiments, the user interface portion includes a camera and a manual zoom feature. In some embodiments, the processing portion includes a cavity sized to receive fingers of a hand. The apparatus also includes a stand that is hingedly coupled to the processing portion. The stand rotates about a second axis orthogonal to the first axis. In some embodiments, the stand includes a U-bar. When the stand is coupled to the processing portion in an open position, the U-bar is able to receive cables therethrough. When the stand is coupled to the processing portion in a closed position, the stand is positioned within a recess, adapted to receive the stand, of the processing portion. In some embodiments, at least a portion of the stand includes anti-skid material.

In another aspect, an electronic device includes a panel and a display screen. The panel typically includes processing circuitry. The display screen is typically electrically and mechanically coupled to the panel. In some embodiments, the display screen is detachable from the panel. The display screen is able to translate along an axis of the panel. The display screen is able to stop to be locked or secured in one of a plurality of positions along the axis. During translation of the display screen along the axis, the display screen is substantially in contact with the panel. In some embodiments, the electronic device also includes a foot coupled to a bottom of the panel. The foot can extend from and retract to the panel. The foot is releasably coupled with the panel. The foot is configured to provide a space between the panel and a surface, such as a table top, for supporting the electronic device. The space is configured to receive a keyboard.

In yet another aspect, a system includes a plurality of first interchangeable panels and a second panel configured to removably couple with one of the first interchangeable panels. A position of the one of the first interchangeable panels is typically adjustable along an axis of the second panel. The second panel typically includes at least one of input/output ports and connections to external drives. In some embodiments, the system also includes a spring mechanism configured to adjust the position of the one of the first interchangeable panels. In some embodiments, the system also includes a latch mechanism configured to engage the one of the first interchangeable panels to the second panel.

In yet another aspect, a processing device includes a front surface. The front surface is adapted to slidably couple with a removable interface device. The processing device also includes a back surface. The back surface includes a recess along a portion of a first edge, a top edge, and a portion of a second edge of the back surface. The processing device also includes a stand coupled to the back surface. The stand is configured to rotate about an axis. In one position of the stand, the recess is configured to receive the stand.

In yet another aspect, an interface device includes a front surface and a back surface. The front surface includes a display screen, a camera, and a manual zoom feature. The back surface is adapted to slidably couple with a removable processing device along an axis of the removable processing device.

BRIEF DESCRIPTION OF THE DRAWINGS

Reference will now be made in detail to implementations of the present invention as illustrated in the accompanying drawings. The same reference indicators will be used throughout the drawings and the following detailed description to refer to the same or like parts.

DETAILED DESCRIPTION OF THE INVENTION

In the following description, numerous details are set forth for purposes of explanation. However, one of ordinary skill in the art will realize that the invention may be practiced without the use of these specific details. Thus, the present invention is not intended to be limited to the embodiments shown but is to be accorded the widest scope consistent with the principles and features described herein.

Embodiments of the present invention are directed towards an all-in-one (AIO) computing device with an adjustable screen height. The AIO computing device typically includes a processing portion and a user interface portion. The user interface portion is slidably coupled to the processing portion along a first axis. The user interface portion is configured to translate along the first axis and stop to be fixed in one of a plurality of positions along the first axis. The AIO computing device also includes a camera and a focusing mechanism. The camera and the focusing mechanism are both mechanically and electrically coupled to the user interface portion. The AIO computing device also includes a stand. The stand is hingedly coupled to the processing portion. The stand rotates about a second axis orthogonal to the first axis. In some embodiments, the stand includes a U-bar. When the stand is coupled to the processing portion in an open position, the user interface portion is positioned substantially upright and the U-bar is able to receive cables therethrough. When the stand is coupled to the processing portion in a closed position, the stand is positioned within a recess (which is adapted to receive the stand) of the processing portion, and the U-bar is positioned adjacent to a cavity (which is adapted to receive the U-bar) of the processing portion. In such a closed position, the AIO computing device can be easily carried and/or mounted on a wall. Furthermore, in such a closed position, the packaging volume of the AIO computing device is advantageously reduced. The AIO computing device also includes a foot. The foot is removably coupled to the bottom of the user interface portion.

Figure 1A:
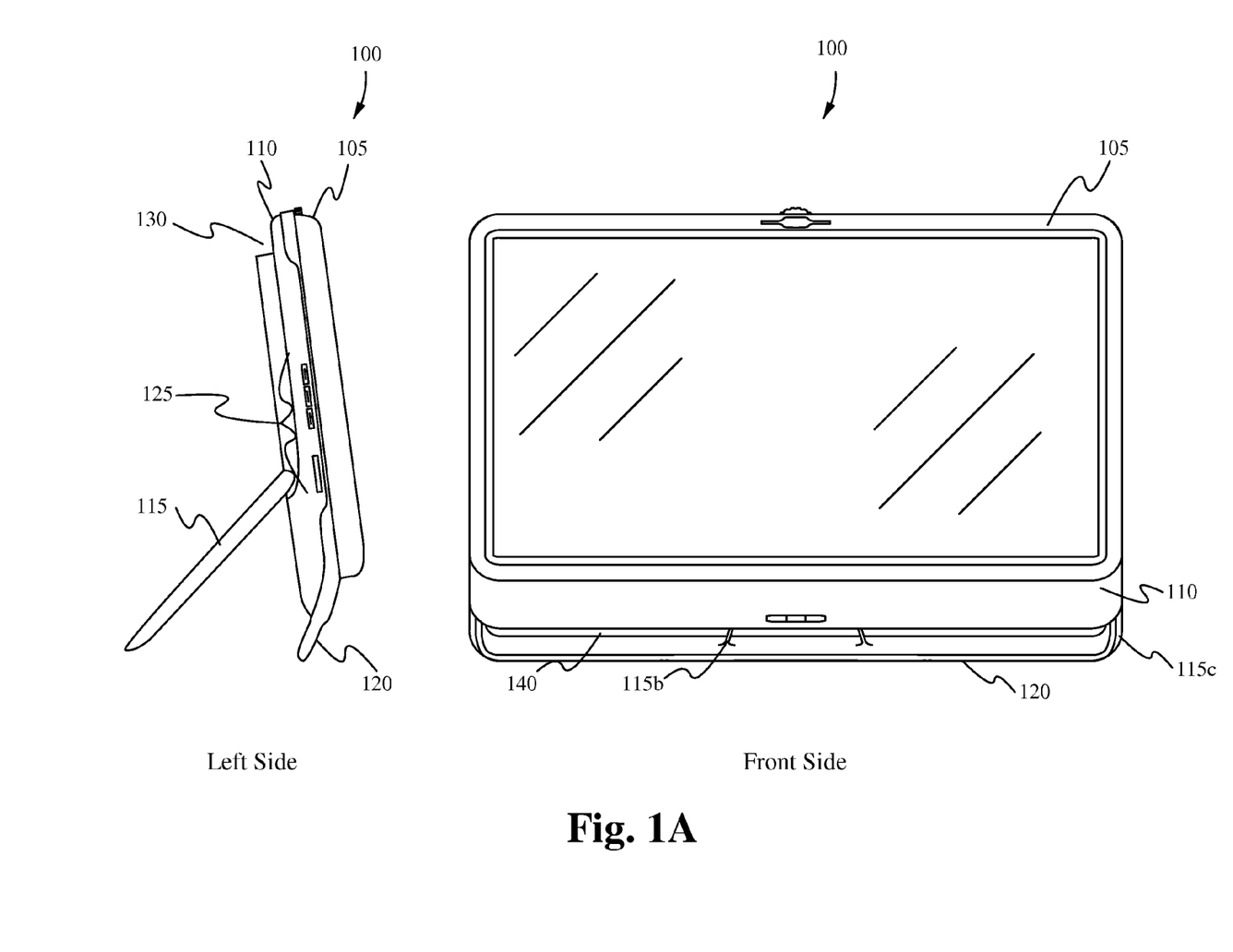
FIGS. 1A-1B illustrate an exemplary AIO computing device in accordance with the present invention.
Figure 1B:
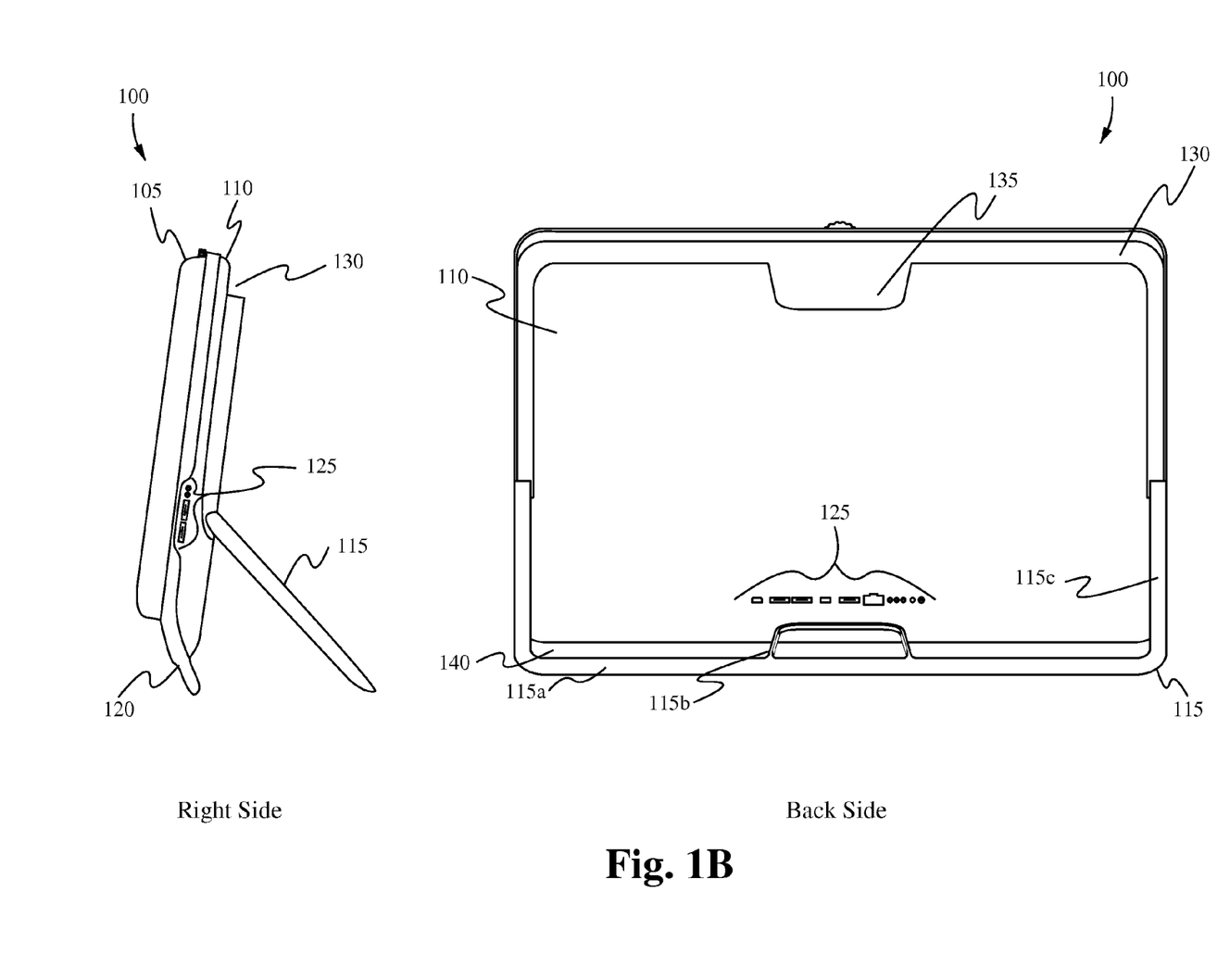

FIGS. 1A-1B illustrate an exemplary AIO computing device 100 in accordance with the present invention. In particular, four sides of the AIO computing device 100 are shown: a left side of the AIO computing device 100 is shown in the leftmost illustration of FIG. 1A, a front side of the AIO computing device 100 is shown in the rightmost illustration of FIG. 1A, and a right side of the AIO computing device 100 is shown in the leftmost illustration of FIG. 1B, and a back side of the AIO computing device 110 is shown in the rightmost illustration of FIG. 1B.

The AIO computing device 100 typically includes a user interface portion 105 and a processing portion 110. As illustrated in FIGS. 1A-1B, the user interface portion 105 and the processing portion 110 are both planar. Alternatively, the processing portion 110 can be of other shapes, although an interfacing surface with the user interface portion 105 is preferably planar.

The user interface portion 105 and the processing portion 110 are mechanically and electrically coupled together. The user interface portion 105 is typically a display screen. The processing portion 110 is typically a computing system and includes system circuitry (e.g., motherboard, printed circuit board), I/O ports and connections to external drives 125, and/or other components of a typical computer system (e.g., connector to the display panel, power connection, fan).

The user interface portion 105 is able to move or translate along a first axis and stop to be secured in one of a plurality of positions along the first axis. In some embodiments, the AIO computing device 100 includes a spring mechanism (not illustrated) or the like configured to adjust the position of the user interface portion 105 long the first axis to a desired position. In some embodiments, the AIO computing device 100 also includes a latch mechanism or the like that engages the user interface portion 105 to the processing portion 110 to prevent the user interface portion 105 from sliding from the desired position.

Figure 2A:
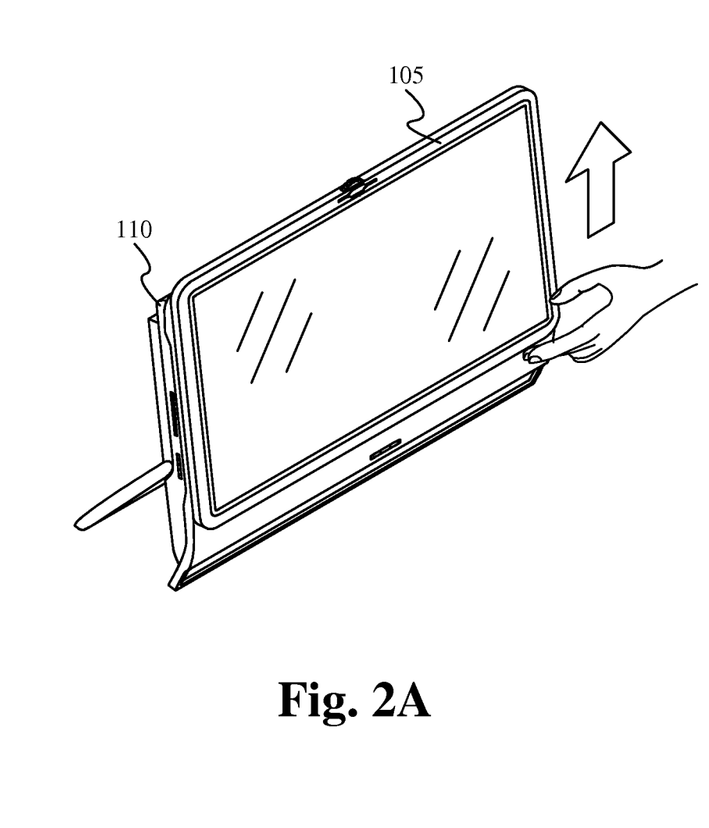
FIGS. 2A-2B illustrate two exemplary positions of a user interface portion along a first axis in accordance with the present invention.
Figure 2B:
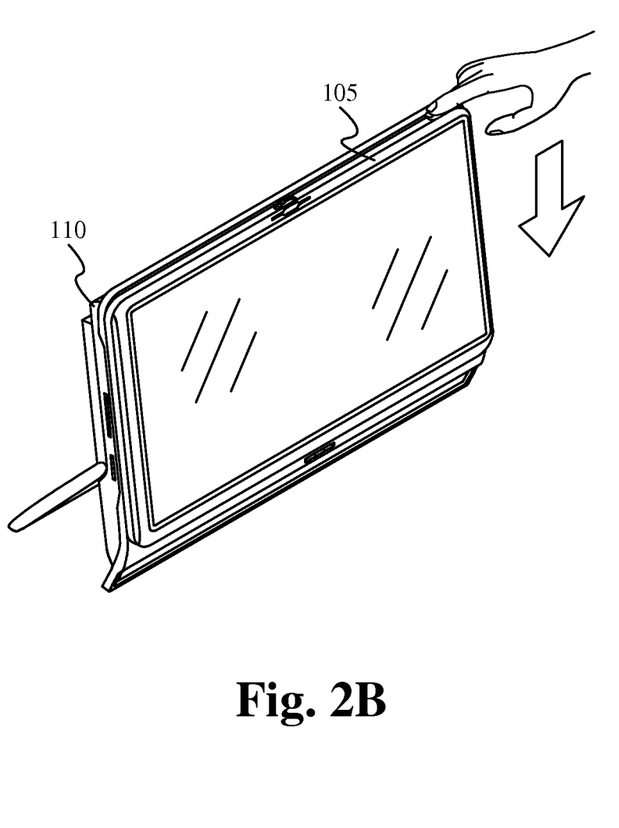

FIGS. 2A-2B illustrate two exemplary positions of the user interface portion 105 along the first axis in accordance with the present invention. The first axis is indicated by the arrows. As shown in FIG. 2A, the user pushes the user interface portion 105 up from the bottom of the user interface portion 105 to a desired screen height. The spring mechanism allows the user to adjust the height of the user interface portion 105, while the latch mechanism engages the user interface portion 105 with the processing portion 110 at the desired screen height. As shown in FIG. 2B, the user pushes down the user interface portion 105 from the top of the user interface portion 105 to a lower position or to return to an initial position. In the initial position, the top of the user interface portion 105 is typically flush with the top of the processing portion 110 (see left view and right view in FIGS. 1A-1B). The adjustability of the user interface portion 105 advantageously allows users of different heights to use the AIO computing device 100 without the need to resort to alternative solutions, such as positioning the AIO computing device 100 on a raised platform to a desired screen height. Accordingly, family members—children and parents—can each have the AIO computing device 100 positioned at a desired or correct screen level during use.

Figure 3:
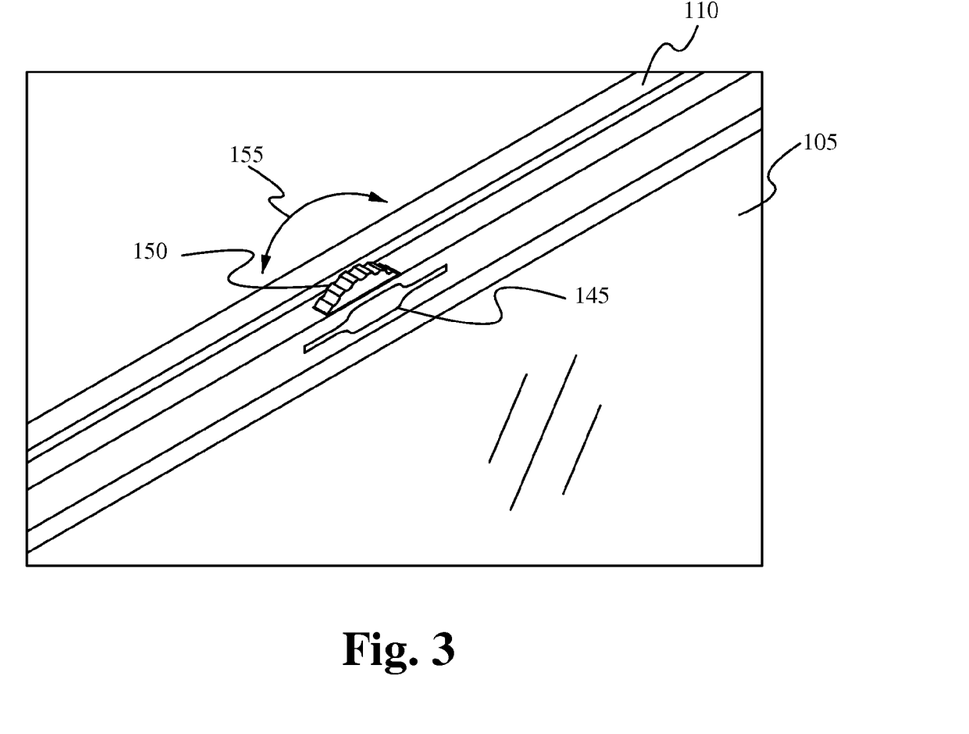
FIG. 3 illustrates a camera and zoom mechanism coupled to the user interface portion of FIG. 2A in accordance with the present invention.

In some embodiments, the user interface portion 105 includes a camera and a zoom mechanism. As illustrated in FIG. 3, both the camera 145 and the zoom mechanism 150 are located substantially at a top, center of the user interface portion 105. The zoom mechanism 150 allows the camera 145 to zoom in and out. In some embodiments, the zoom mechanism 150 allows a user to manually zoom using a dial, buttons, or the like. In FIG. 3, the zoom mechanism 150 is shown as a dial, which can be operated by rotating the dial to the left or the right, as indicated by the arrow 155. Alternatively or in addition, the zoom can be software controlled. The user interface portion 105 can also include one or more light sources. In some embodiments, the camera 145 can be manually tilted (e.g., right, left, up, down).

Returning to FIGS. 1A-1B, the processing portion 110 includes a recess 130 along a section of the first side edge, the top edge, and a section of the second side edge of the processing portion 110, as illustrated in FIG. 1B. The processing portion 110 also includes a cavity 135. The cavity 135 is typically located near the top, center but below the recessed top edge of the processing portion 110. The cavity 135 is typically sized to receive fingers of a user's hand.

The AIO computing device 100 also includes a stand 115. The stand 115 is hingedly coupled to the processing portion 110. In some embodiments, legs 115c of the stand 115 are coupled to bottom areas of the recess 130. The stand 115 rotates about a second axis orthogonal to the first axis. The stand 115 can be rotated to an open position and a closed position. In some embodiments, the stand 115 can be rotated to any position between the open position and the closed position to adjust the tilt of the user interface portion 105.

In some embodiments, the stand 115 includes a U-bar 115b centrally located on the stand 115. The U-bar 115b is coplanar with the base 115a of the stand 115. In some embodiments, at least a portion of the stand 115 comprises anti-skid material, such as rubber, to stabilize the MO computing device 100 during use. For example, anti-skid material is formed on the two ends of the stand 115 (see FIG. 4B).

Figure 4A:
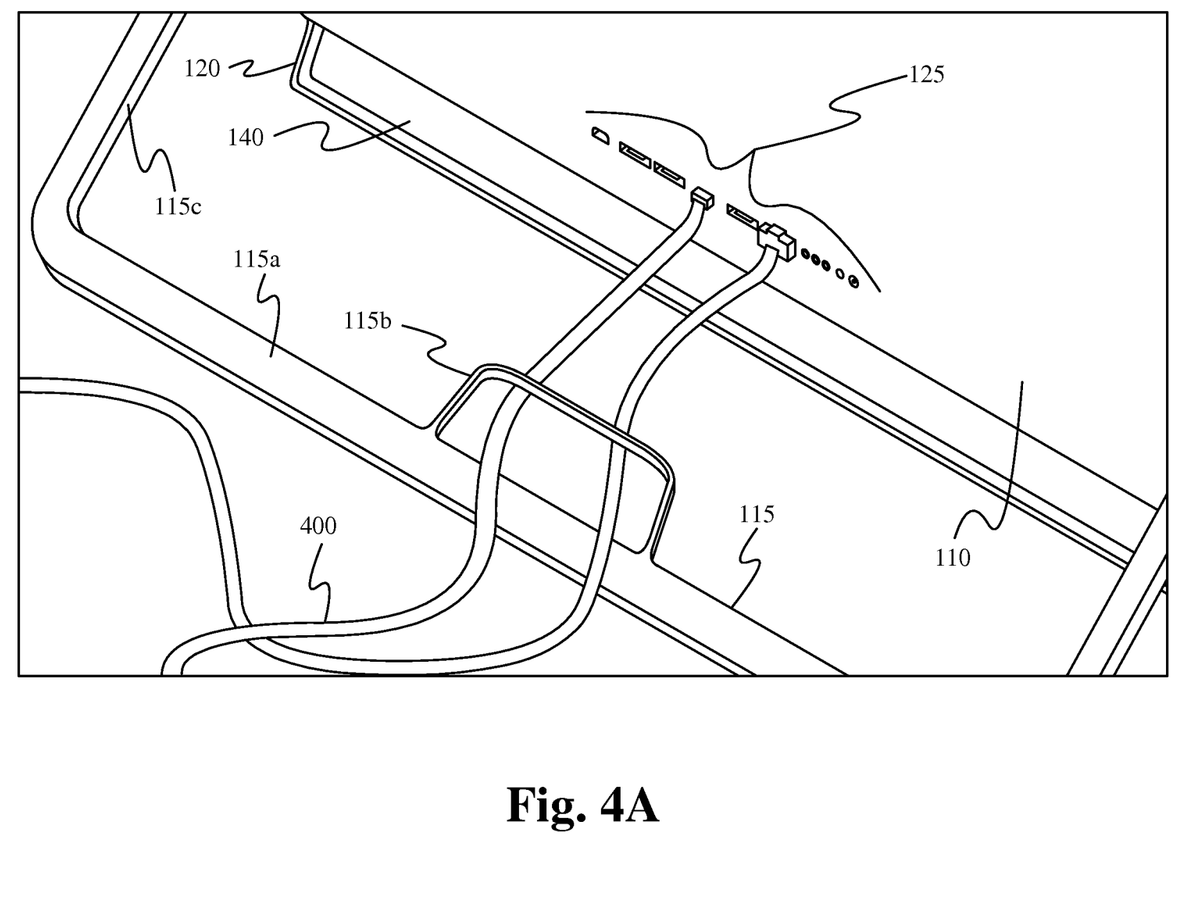
FIG. 4A illustrates a stand in an open position in accordance with the present invention.

FIG. 4A illustrates the stand 115 in the open position in accordance with the present invention. When the stand 115 is rotated to the open position, the U-bar 115b is angled up towards the back of the processing portion 110, creating a passageway for cables 400. The U-bar 115b is able to receive the cables 400 therethrough. This integrated cable routing management function advantageously organizes cables coupled to the processing portion 110. Furthermore, when the stand 115 is rotated to the open position, the U-bar 115b is configured to position the user interface portion 105 in a substantially upright position.

Figure 4B:
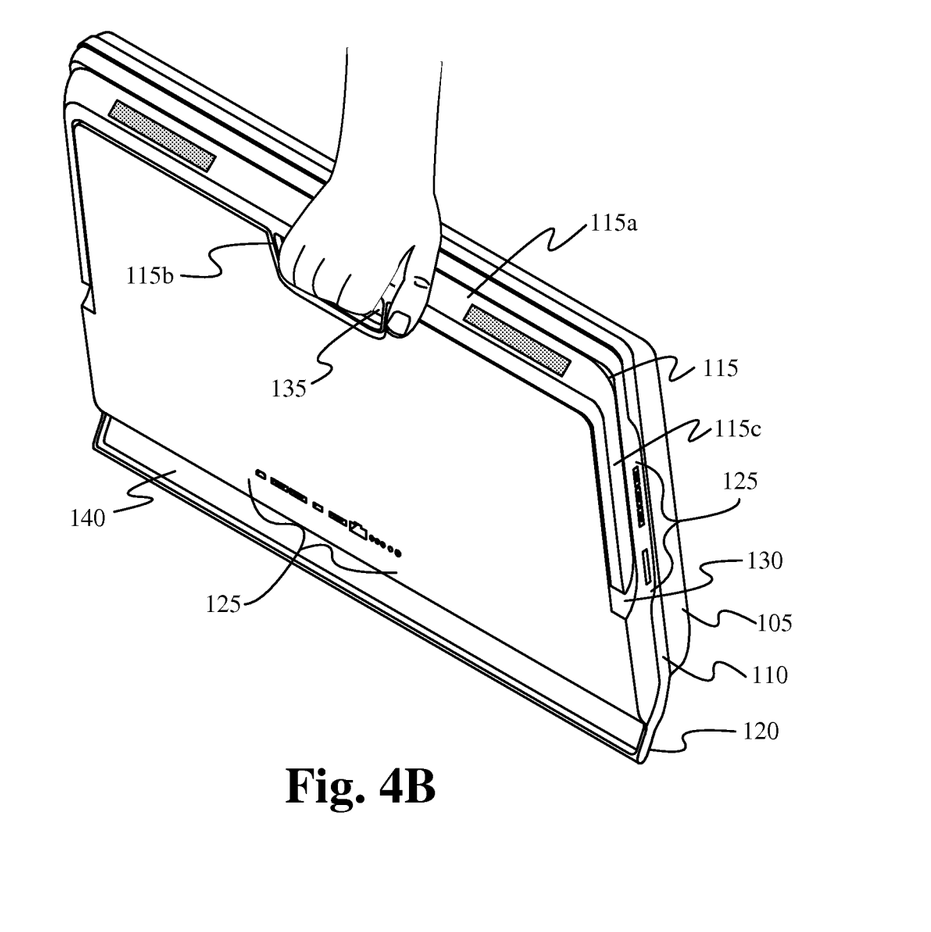
FIG. 4B illustrates the stand of FIG. 4A in a closed position in accordance with the present invention.

FIG. 4B illustrates the stand 115 in the closed position in accordance with the present invention. When the stand 115 is rotated to the closed position, the legs 115c and the base 115a of the stand 115 are positioned within the recess 130, which is adapted to receive the legs 115c and the base 115a of the stand 115, and the U-bar 115b is positioned within the cavity 135, which is adapted to receive the U-bar 115b. Furthermore, when the stand 115 is rotated to the closed position, the user can easily pick up the processing portion 110 with or without the user interface portion 105 coupled thereto. In addition, the AIO computing device 100 to be easily mounted when the stand 115 is coupled to the processing portion 110 in the closed position. Typically, such mount is VESA (Video Electronics Standards Association) compliant. Furthermore, in the closed position, the packaging volume of the MO computing device 100 is advantageously reduced.

Returning to FIGS. 1A-1B, the AIO computing device 100 also includes a foot 120 coupled to a bottom of the processing portion 110. In some embodiments, the foot 120 elevates the AIO computing device 100 above a surface such that there is spacing 140 between the processing portion 110 (and thus the user interface portion 105) and the surface that supports the AIO computing device 100. In some embodiments, the spacing 140 advantageously allows for keyboard storage. In some embodiments, at least a portion of the foot 120 comprises anti-skid material, such as rubber, to stabilize the AIO computing device 100 during use. In some embodiments, the foot 120 is removable from the processing portion 110. Removing the foot 120 also reduces the packaging volume of the AIO computing device 100 of the present invention. In some embodiments, the foot 120 is reversibly extendable from the processing portion 110 to customize the tilt angle of the user interface portion 105.

Figure 5:
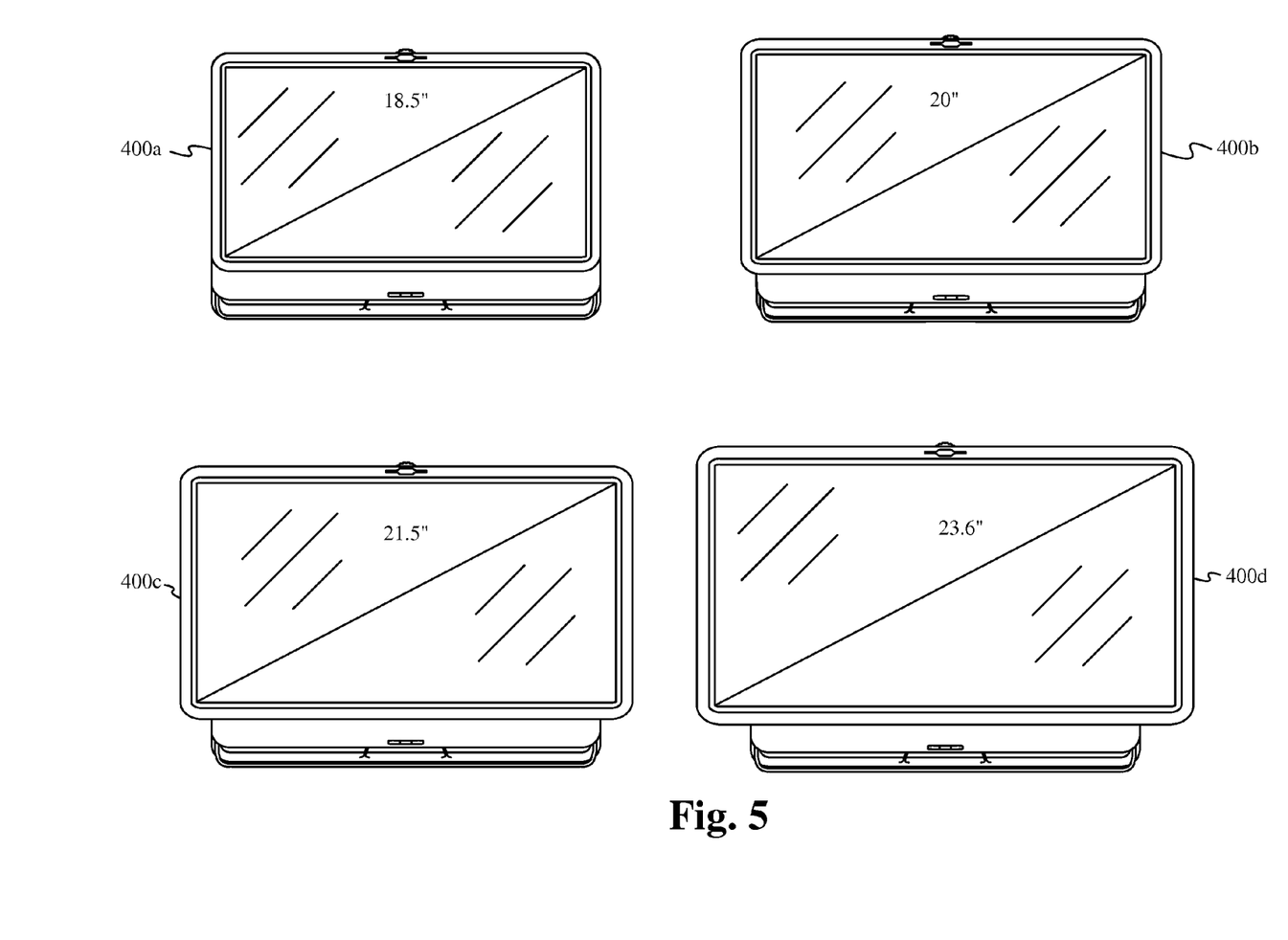
FIG. 5 illustrates four exemplary user interface portions in accordance with the present invention.

In some embodiments, the user interface portion 105 is detachable from the processing portion 110, allowing the processing portion 110 to couple with another user interface portion. The processing portion 110 is configured to couple with user interface portions of different sizes. FIG. 5 illustrates four exemplary user interface portions 400 in accordance with the present invention. Although FIG. 5 illustrates a user interface portion 400a having an 18.5" screen size, other user interface portions having larger or small screen sizes are contemplated, including, but not limited to, having a 20" screen size (400b), a 21.5" screen size (400c), or a 23.6" screen size (400d), to name only a few such screen sizes. The processing portion 110 of the present invention allows a user to advantageously reduce investment fees if the user needs a different size user interface portion. Instead of purchasing a new AIO computing device having a different size user interface portion, the present invention allows a user to replace an attached user interface portion of the AIO computing device with another user interface portion.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. An apparatus comprising:
    a. a processing portion and a user interface portion slidably coupled to the processing portion along a first axis; and
    b. a stand hingedly coupled to the processing portion and configured to rotate about a second axis orthogonal to the first axis, wherein the stand comprises a U-bar configured to receive cables therethrough when the stand is coupled to the processing portion in an open position.

2. The apparatus of claim 1, wherein the user interface portion comprises a camera and a manual zoom feature.

3. The apparatus of claim 1, wherein the processing portion comprises a cavity sized to receive fingers of a hand.

4. The apparatus of claim 1, wherein when the stand is coupled to the processing portion in a closed position, the stand is positioned within a recess, adapted to receive the stand, of the processing portion.

5. The apparatus of claim 1, wherein at least a portion of the stand comprises anti-skid material.

6. An electronic device comprising:
    a. a panel comprising processing circuitry;
    b. a display screen electrically and mechanically coupled to the panel, wherein the display screen is configured to translate along an axis of the panel and stop to be secured in one of a plurality of positions along the axis; and
    c. a foot coupled to a bottom of the panel.

7. The electronic device of claim 6, wherein the display panel is planar with the panel during translation of the display screen along the axis.

8. The electronic device of claim 6, wherein the foot is configured to provide a space between the panel and a surface for supporting the electronic device.

9. The electronic device of claim 8, wherein the space is configured to receive a keyboard.

10. A system comprising:
    a. a plurality of first interchangeable panels; and
    b. a second panel configured to removably couple with one of the first interchangeable panels, wherein a position of the one of the first interchangeable panels is adjustable along an axis of the second panel, and wherein the second panel comprises a cavity sized to receive fingers of a hand.

11. The system of claim 10, wherein the second panel comprises at least one of input/output ports and connections to external drives.

12. A processing device comprising:
    a. a front surface adapted to slidably couple with a removable interface device;
    b. a back surface including a recess along a portion of a first edge, a top edge, and a portion of a second edge of the back surface; and
    c. a stand coupled to the back surface, wherein the stand is configured to rotate about an axis, and wherein in one position of the stand, the recess is configured to receive the stand, and wherein the stand comprises a U-bar configured to receive cables therethrough when the stand is coupled to the processing device in another position of the stand.

* * * * *

UNITED STATES PATENT AND TRADEMARK OFFICE
CERTIFICATE OF CORRECTION

| | | |
|---|---|---|
| PATENT NO. | : 8,526,178 B2 | Page 1 of 1 |
| APPLICATION NO. | : 13/109848 | |
| DATED | : September 3, 2013 | |
| INVENTOR(S) | : Chun-Ting Wu and Yu-Tsiang Lin | |

It is certified that error appears in the above-identified patent and that said Letters Patent is hereby corrected as shown below:

IN THE SPECIFICATION

At column 4, line 61, please replace "MO" with -- AIO -- so that the corresponding phrase reads -- the AIO computing device --.

At column 5, line 22, please replace "MO" with -- AIO -- so that the corresponding phrase reads -- the AIO computing device --.

Signed and Sealed this
Eighth Day of October, 2013

Teresa Stanek Rea
*Deputy Director of the United States Patent and Trademark Office*